United States Patent [19]
Ishibai et al.

[11] Patent Number: 5,204,781
[45] Date of Patent: Apr. 20, 1993

[54] INFINITE LARGE-APERTURE LENS SYSTEM WITH ASPHERICAL SURFACES

[75] Inventors: Isao Ishibai; Yutaka Kawai, both of Tokyo, Japan

[73] Assignee: Hoya Corporation, Tokyo, Japan

[21] Appl. No.: 793,272

[22] Filed: Nov. 4, 1991

Related U.S. Application Data

[63] Continuation of Ser. No. 482,848, Feb. 22, 1990, abandoned.

[30] Foreign Application Priority Data

Feb. 24, 1989 [JP] Japan .................................. 1-44398

[51] Int. Cl.$^5$ ................................................ G02B 3/02
[52] U.S. Cl. ..................................... 359/708; 359/712
[58] Field of Search ............................... 350/432–435; 359/708, 712

[56] References Cited

U.S. PATENT DOCUMENTS 4,449,792  5/1984  Arai et al. ........................... 350/432
4,765,723  8/1988  Takamura ........................... 350/432

*Primary Examiner*—Bruce Y. Arnold
*Assistant Examiner*—Hung X. Dang
*Attorney, Agent, or Firm*—Spencer, Frank & Schneider

[57] ABSTRACT

A large-aperture lens system with a lens having aspherical surfaces to be used to read out optical information and to be used in optical communication transmission systems or the like. The lens in the system has a large aperture despite its very small focal length, because it is manufactured using glass with both a high refractive index and a high Abbe number giving the lens excellent aberration characteristics. The system can be manufactured using ultra-precision press-molding technology.

4 Claims, 2 Drawing Sheets (LONGITUDINAL SPHERICAL ABER.)

(ASTIGMATIC FIELD CURVES)

(DISTORTION)

(LONGITUDINAL SPHERICAL ABER.)

(ASTIGMATIC FIELD CURVES)

(DISTORTION)

INFINITE LARGE-APERTURE LENS SYSTEM WITH ASPHERICAL SURFACES

This application is a continuation of application Ser. No. 07/482,848, filed Feb. 22nd, 1990, now abandoned.

BACKGROUND OF THE INVENTION

The present invention relates to a large-aperture lens with aspherical surfaces which is suitable for use in the readout of optical information, in a transmission system of optical communication, or the like.

In the prior art, a large-aperture lens with aspherical surfaces has been used in laser pickups used in compact disks (CD), laser disks (LD), etc. In the recent years, it has come to be widely used in magnetic optical memory of computers and fine optical system of optical communication transmission systems.

A large-aperture lens with aspherical surfaces has a wide field of applications. Generally, its numerical aperture (NA) is 0.45 to 0.55 and its focal length is approximately from 3.5 to 10.0.

For its materials, plastic is often used become it is inexpensive, has excellent workability, and is light in weight. A plastic lens in which both surfaces are formed as aspherical surfaces is widely used, for example, in CD players.

However, plastic has problems with respect to heat resistance, moisture absorption, and birefringence (homogeneity). Because of its insufficient heat resistance, there is a possibility that the properties of plastic may be changed by the high temperature treatment used in joining it with an optical lens mount. When a sealing glass is used at the time of fixing a lens, the outer circumference of the lens is exposed to temperatures of 400° C. to 500° C. during gold plating. Therefore, plastic lenses cannot be used in such conditions.

As a lens for use in connectors for optical fibers, a gradient index lens has traditionally been available. Such a lens has gradient index characteristics because it has been manufactured by an ion exchange method and its quality varies greatly from lot to lot. Further, these exert an adverse influence on spherical aberration, etc. It is difficult to deal with a high numerical aperture, and therefore it cannot be used stably in high-precision optical systems in which semiconductor laser light sources are used.

Furthermore, U.S. Pat. No. 4,449,792 describes a large-aperture single lens with aspherical surfaces and U.S. Pat. No., 4,571,034 describes a lens system for optical recording type disks. In either of these lenses, if one desires to obtain a lens having a shorter focal length of 1 mm or so, as is required for optical communication connector lens, the vertex radius and wave front aberration obtained do not show desired values.

SUMMARY OF THE INVENTION

Recently, a machining method was established in which ultra-high precision press-molding technology is used in the manufacture of lenses, thereby enabling aspherical lenses to be manufactured with very high precision. For example, in the case where high connection efficiency is to be obtained, as in a connector lens for optical communication, by transmitting semiconductor laser beams to fiber end surfaces, two or more lenses must be used in an optical system in the infinite conjugation system.

An object of the present invention is to provide a large-aperture lens with aspherical surfaces having a large aperture despite its very small focal length by manufacturing an aspherical lens using a high refractive index glass by means of ultra-precision press-molding technology.

In order to achieve the above-mentioned objects, a large-aperture lens with aspherical surfaces according to the present invention has aspherical surfaces in which the first and second surfaces are represented by equation (1) and is formed with the conditions of equations (2) to (4) being fulfilled.

$$Z=[C_iY^2/[1+(1-(1+K_i)C_i^2Y^2)^{\frac{1}{2}}]]+E_iY^4+F_iY^6+G_iY^8+H_iY^{10} \quad (1)$$

$$1.0<(f/NA)<3.0 \quad (2)$$

$$1.2<r_1/[(n-1)f]<2.3 \quad (3)$$

$$n>1.70, \nu>30.0 \quad (4)$$

where, $Z$: Distance from plane vertical to an optical axis passing the apex to aspherical surface $Y$: Height from optical axis $C_i$: Curvature of the aspherical surface apex of the i-th surface $(1/r_i)$ $K_i$: Conical constant of the i-th surface $E_i$ to $H_i$: Coefficients of aspherical surfaces of the fourth- to tenth-order of the i-th surface NA: Numerical aperture f: Focal length d: Lens thickness $r_i$: Radius of curvature of aspherical surface apex of the i-th surface n: Refractive index of glass $\nu$: Abbe number of glass In a large-aperture lens with aspherical surfaces constructed as described above, f in equation (2) represents the focal length of a lens, and NA represents its numerical aperture. This equation indicates the range which f can take when NA is determined.

In order to satisfy equation (2), if the lens has a high numerical aperture, its absolute focal length value can not become larger.

If f/NA becomes smaller than 1.0, the lens is a wide angle lens, and the radius of curvature becomes extremely small at both surfaces or at one surface to satisfy power. Accordingly correction of an off-axial wave front aberration becomes difficult.

That is, if shown in a third-order aberration amount, the spherical aberration is undercorrected in the vicinity of the zonal luminous flux and overcorrected in the marginal luminous flux, causing spherical aberration to be increased. Further a large difference in astigmatism occurs in the tangential direction with respect to the sagittal direction, which does not meet the object of the present invention. Furthermore, if the NA is increased under this condition, its focal length becomes shorter. Therefore, it is very difficult to obtain a field angle which satisfies NA, and it is difficult to attain a curvature radius value at which machining can be performed. By contrast, if f/NA becomes greater than 3.0 and has high NA, the absolute focal length and the absolute curvature radius both become larger. Therefore, design and manufacture are relatively simplified.

The spherical aberration from an optical axis to a zonal luminous flux is undercorrected, but the aberration can be improved. However, the objects of higher NA and a shorter focal length cannot be achieved. That is, circumstances contrary to the conditions of lightness in weight and compactness have occurred. These are excluded from the present invention.

When $r_1/[(n-1)f]$ becomes smaller than 1.2 in equation (3), the radius of the curvature of the first surface becomes relatively small with respect to the focal length, causing the astigmatism to be large and the off-axis wave front aberration becomes unfavorable. When $r_1/[(n-1)f]$ becomes greater than 2.3, spherical aberration can no longer be corrected.

In the condition of, $n > 1.70$, $\nu > 30.0$, where an aspherical lens having a very small focal length of which f is 1.00 or thereabouts (0.5 to 1.5 mm) is made, the size of the radii of curvature of the first and second surfaces has a strong correlation to the aberration of a lens and to problems in its manufacture. Generally, as the focal length becomes shorter, the radii of curvature of the first and second surfaces become shorter, and therefore design and manufacture becomes difficult. If materials having a small refractive index, such as plastics (n=1.49), glass FCD1 (n=1.49), etc. are used, a further small radius of curvature must be adopted. As a result, conditions for the correction of astigmatism, coma aberration and spherical aberration become increasingly unfavorable. At the manufacturing stage after design, the radius of curvature exerts a large influence on the degree of difficulty with respect to machining, regardless of whether a lens is manufactured by a press-molding or is directly ground. This greatly affects not only the performance of a lens but its manufacturing cost. Where such a lens is used in an environment of 1300 to 1550 nm for optical communication, the value of a refractive index at the wavelength as compared with nd (refractive index at 587.6 nm) becomes increasingly smaller. Therefore, a lens material having a high refractive index of $n > 1.70$ is absolutely required.

These and other objects, features and advantages of the present invention will become clear by the following description of preferred embodiments of the present invention with reference to the accompanying drawings.

DESCRIPTION OF THE PREFERRED EMBODIMENTS

A large-aperture lens with aspherical surfaces according to the present invention will be explained below in detail.

Figure 1:
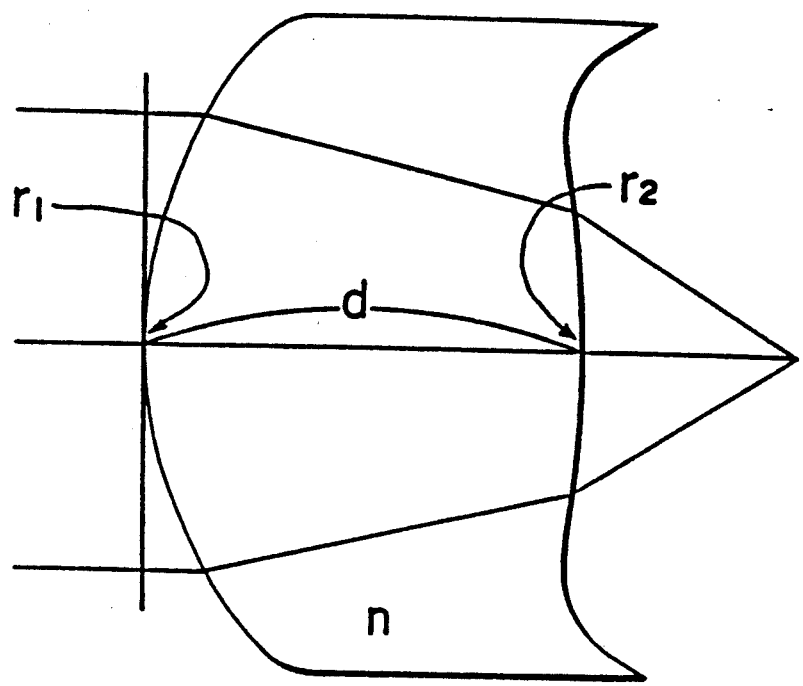
FIGS. 1 and 2 illustrate light paths in a large-aperture lens with aspherical surfaces in the first and second embodiments of the present invention.
Figure 2:
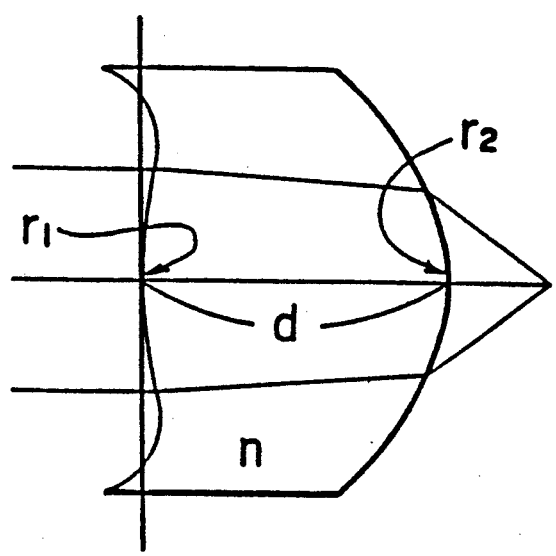
Figure 3:
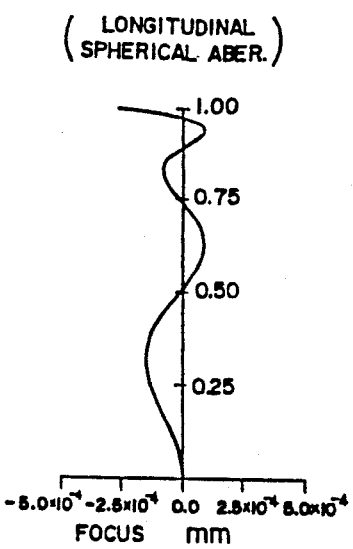
FIGS. 3(a), 3(b) and 3(c) are graphs illustrating aberration characteristics of the large-aperture lens with aspherical surfaces in the above-mentioned first embodiment.
Figure 3:
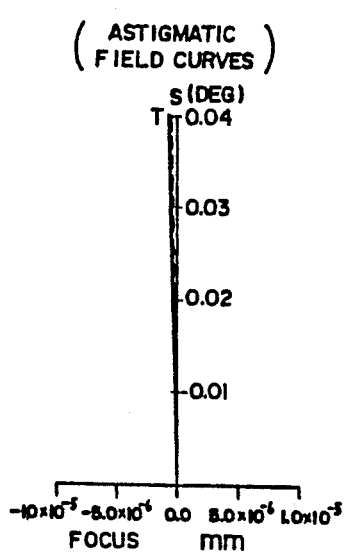
Figure 3:
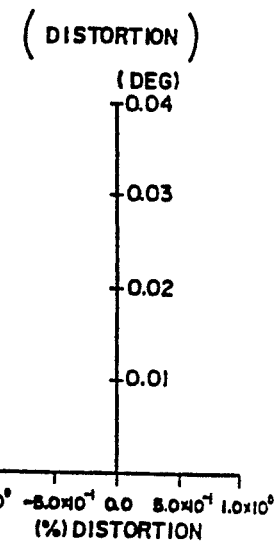
Figure 4:
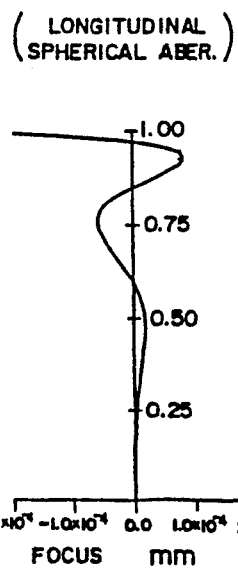
FIGS. 4(a), 4(b) and 4(c) are graphs illustrating aberration characteristics of the large-aperture lens with aspherical surfaces in the above-mentioned second embodiment.
Figure 4:
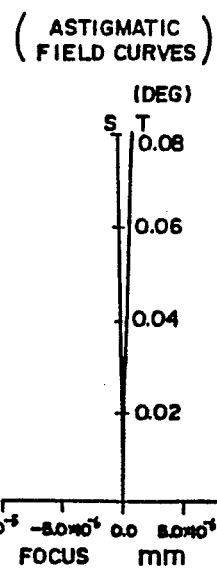
Figure 4:
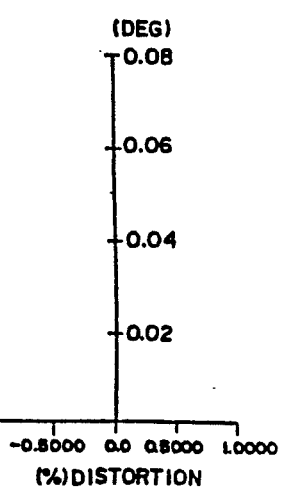

FIGS. 1 and 2 are light path views of the large-aperture lens with aspherical surfaces in the first and second embodiments of the present invention. As shown, light entering the lens from the left or object side is parallel and therefore the magnification $\beta$ is zero. For glass having a high refractive index, which is a raw material for a lens according to the present invention, the glass should also have a glass transformation temperature (Tg) greater than 580° C. Hence, the heat resistance versus moisture absorption characteristics, and the temperature characteristics, of a lens are enhanced.

Data of two Embodiments is listed below.

|  | First Embodiment | Second Embodiment |
| --- | --- | --- |
| n | 1.782999 | 1.782999 |
| f | 1.6 | 0.7 |
| d | 1.7 | 1.2 |
| WD | 0.84 | 0.4 |
| $r_1$ | 1.56629 | 1.22961 |
| $K_1$ | 0.45998 | −4.047151 |
| $E_1$ | $-0.489857 \times 10^{-1}$ | $-0.152374 \times 10^0$ |
| $F_1$ | $-0.248420 \times 10^{-1}$ | $-0.100630 \times 10^1$ |
| $r_2$ | −3.27588 | −0.56509 |
| $K_2$ | −19.612476 | −3.914536 |
| $E_2$ | $-0.747572 \times 10^{-1}$ | $-0.241193 \times 10^0$ |
| $F_2$ | $0.156673 \times 10^0$ | $-0.496479 \times 10^{-1}$ |
| wave front aberration (RMS) |  |  |
| On axis | 0.001 λ | 0.000 λ |
| Off axis | 0.002 λ | 0.003 λ |

In the above-mentioned embodiments, the wave front aberration on axis indicates a numerical value on an optical axis and the wave front aberration off axis indicates a numerical value at 5 μm from the optical axis. WD indicates a working distance. FIGS. 3(a) through 4(c) are graphs illustrating the aberration characteristics of the large-aperture lens with aspherical surfaces in the above-mentioned first and second embodiments.

As explained in detail above, the lens according to the present invention having a large aperture made by aspherical press-molding, and excellent aberration characteristics, as described above, can be obtained even when the focal length is short, i.e., 1.6 mm (1st embodiment) or 1.9 mm (2nd embodiment). Therefore, it can preferably be used in optical fiber transmission path, etc. The process of assembling it is simple.

As many apparently widely different embodiments of the present invention can be made without departing from the spirit and scope thereof, it is to be understood that this invention is not limited to the specific embodiments thereof except as defined in the appended claims.

What is claimed is:

1. An infinite lens system for receiving light having parallel rays and wavelengths between 1300 nm and 1550 nm and for collimating light having wavelengths between 1300 nm and 1550 nm, said lens system comprising a large-aperture lens with first and second aspherical surfaces represented by equation (1), the lens also having a shape and formed from a glass fulfilling the conditions of equations (2) to (4)

$$Z = [C_i Y^2 / [1 + (1-(1+K_i)C_i^2 Y^2)^{\frac{1}{2}}]] + E_i Y^4 + F_i Y^6 + G_i Y^8 + H_i Y^{10} \tag{1}$$

$$1.0 < (f/NA) < 3.0 \tag{2}$$

$$1.2 < r_1/[(n-1)f] < 2.3 \tag{3}$$

$$n > 1.70, \nu > 30.0 \tag{4}$$

where,

Z: Distance from a plane vertical to an optical axis passing the apex to one of the first and second aspherical surfaces Y: Height from the optical axis of the lens $C_i$: Curvature of the aspherical surface apex of the i-th surface ($1/r_i$)

$K_i$: Conical constant of the i-th surface $E_i$ to $H_i$: Coefficients of aspherical surfaces of the fourth- to tenth-order of the i-th surface NA: Numerical aperture f: Focal length d: Lens thickness $r_i$: Radius of curvature of aspherical surface apex of the i-th surface n: Refractive index of the glass at wavelengths between 1300 nm and 1550 nm $v$: Abbe number of the glass at wavelengths between 1300 nm and 1550 nm, wherein i=1 and 2 for said first and second aspherical surfaces, respectively, and said lens has a magnification factor $\beta$ of zero.

2. A lens according to claim 1, wherein the lens is made from a glass which has a high refractive index and a glass transformation temperature Tg exceeding 580° C.

3. A lens according to claim 2, wherein the lens is produced by precision press-molding.

4. An infinite lens system for use with light having parallel rays and wavelengths between 1300 nm and 1550 nm and for collimating light having wave-lengths between 1300 nm and 1550 nm, said lens system comprising a large-aperture lens having first and second aspherical surfaces meeting the requirements of equation (1)

$$Z=[C_i Y^2/[1+(1-(1+K_i)C_i^2 Y^2)^{\frac{1}{2}}]]+E_i Y^4+F_i Y^6+G_i Y^8+H_i Y^{10} \quad (1)$$

wherein the improvement comprises said large-aperture lens also having a shape and formed from a glass fulfilling the conditions of equations (2) to (4)

$$1.0<(f/NA)<3.0 \quad (2)$$

$$1.2<r_1/[(n-1)f]<2.3 \quad (3)$$

$$n>1.70, \, v>30.0 \quad (4)$$

where,

Z: Distance from a plane vertical to an optical axis passing the apex to one of the first and second aspherical surfaces Y: Height from the optical axis of the lens $C_i$: Curvature of the aspherical surface apex of the i-th surface ($1/r_i$)

$K_i$: Conical constant of the i-th surface $E_i$ to $H_i$: Coefficients of aspherical surfaces of the fourth- to tenth-order of the i-th surface NA: Numerical aperture f: Focal length $r_i$: Radius of curvature of aspherical surface apex of the i-th surface n: Refractive index of the glass at wavelengths between 1300 nm and 1550 nm $v$: Abbe number of the glass at wavelengths between 1300 nm and 1550 nm, wherein i=1 and 2 for said first and second aspherical surfaces, respectively, and said lens has a magnification factor $\beta$ of zero.

* * * * *